US007673658B1

(12) United States Patent  
Brewer et al.

(10) Patent No.: US 7,673,658 B1
(45) Date of Patent: Mar. 9, 2010

(54) LOAD LINE CONNECTION SPILLAGE CONTAINER

(76) Inventors: Jack G. Brewer, 99 Maple La., Chickasha, OK (US) 73018; Steven L. Shroyer, 5017 Kathy Lynn Dr., Norman, OK (US) 73072; Darrel B. Fruit, 2807 Briar Creek Cir., Chickasha, OK (US) 73018; Darrel G. Fruit, 2816 Briar Creek Cir., Chickasha, OK (US) 73018

( * ) Notice: Subject to any disclaimer, the term of this patent is extended or adjusted under 35 U.S.C. 154(b) by 0 days.

(21) Appl. No.: 12/259,577

(22) Filed: Oct. 28, 2008

(51) Int. Cl.
*B65B 1/04* (2006.01)
*D06F 39/08* (2006.01)
*B65D 1/34* (2006.01)

(52) U.S. Cl. .................. 141/86; 220/571; 137/312
(58) Field of Classification Search .......... 141/86, 141/88, 89, 311 A; 220/533, 542, 571; 137/312, 137/313, 314; 222/108–111; 184/106
See application file for complete search history.

(56) References Cited

U.S. PATENT DOCUMENTS

| 441,141 | A | 11/1890 | Dalton |
|---|---|---|---|
| 2,438,245 | A | 3/1948 | Gregg |
| 2,497,969 | A | 2/1950 | Anderson |
| 2,954,797 | A | 10/1960 | Dryer |
| 3,110,157 | A | 11/1963 | Radd |
| 3,562,969 | A | 2/1971 | Little, Jr. |
| 3,871,401 | A | 3/1975 | Lyons |
| 4,819,677 | A | 4/1989 | Stern |
| 4,871,084 | A | 10/1989 | Robbins |
| 4,896,705 | A | 1/1990 | Podgers et al. |
| 4,912,966 | A | 4/1990 | Sharp |
| 4,960,346 | A | 10/1990 | Tamayo |
| 5,002,101 | A | 3/1991 | McLeod |
| 5,058,633 | A | 10/1991 | Sharp |
| 5,060,509 | A | 10/1991 | Webb |
| 5,071,166 | A | 12/1991 | Marino |
| 5,101,869 | A | 4/1992 | Myers |
| 5,152,635 | A | 10/1992 | Ziu |
| 5,313,991 | A | 5/1994 | Murray et al. |
| 5,379,810 | A | 1/1995 | Marino |
| 5,511,573 | A | 4/1996 | Corte |
| D374,147 | S | 10/1996 | Lillelund |
| D380,814 | S | 7/1997 | Brewer |
| 5,647,412 | A | 7/1997 | Brewer |
| 2006/0157112 | A1 | 7/2006 | Brewer et al. |

*Primary Examiner*—Timothy L Maust
(74) *Attorney, Agent, or Firm*—James T. Robinson

(57) ABSTRACT

An injection-molded load line connection spillage container for catching and retaining liquid spilled when liquids are pumped between storage tanks and tankers provides an injection-molded reservoir and an injection-molded cover attached to the reservoir by hinges. Reinforcing ribs molded into the reservoir provide strength and ruggedness without the need for reinforcing steel collars and saddles. Gussets molded into the reservoir hinge brackets ensure repeated stresses produced by energetic opening of the cover does not result in failure of the hinge brackets. An optional load line mounting assembly permits secure mounting of the load line container directly onto the load line. An optional cleanout assembly provides a valved suction line for removing retained spillage, and an optional sampling assembly provides a valved sample line for sampling the liquid being transferred.

20 Claims, 7 Drawing Sheets

LOAD LINE CONNECTION SPILLAGE CONTAINER

BACKGROUND OF THE INVENTION

1. Field of the Invention

This invention relates generally to containment of oil, waste, and chemical spills, and more particularly, to a container for containing spillage at a load line connection. As used herein, the terms "load line connection spillage container," "load line spillage container," and "load line container" refer, interchangeably, to applicants' invention.

2. Discussion

Environmental concerns require containment of oil, waste, and other chemical spills from pipelines, storage tanks, tanker trucks, and railroad tankers. Pollution occurring when liquids are transferred between storage tanks and tanker vehicles through transfer lines is a continuing concern. Although transfer lines occasionally fail, leakage more typically occurs where the line from the tanker truck or railroad tanker attaches to the storage tank unloading line. The transfer lines are normally equipped with quick connect fittings, but spillage can occur during connection and disconnection of the transfer lines.

U.S. Pat. No. 5,313,991 is directed to an oil and waste line connection spillage containment apparatus (also referred to herein as a "load line container") constructed from non-corrosive and rustproof materials. A substantially cylindrical container has two openings for receiving oil and waste loading and unloading lines therein. The lines are connected within the container. A circular cover encloses the container and is fastened and unfastened from the container using a pair of L-shaped members. Any oil and waste spilled from the connection is removed from the container when the lines are disconnected. In the alternative, a removal line with an auxiliary valve is used to withdraw the oil and waste from the container through the loading line. When the unloading line is removed from the opening in the container, a vented plug is inserted into the opening.

U.S. Pat. No. 5,647,412 is also directed to an apparatus for containing oil and waste spillage at a line connection. A load line container has opposed sidewall openings which receive loading and unloading lines, respectively, which are coupled within the container. Any spillage from the ends of the lines and the line connection is retained within the container. A lid closes the top end of the container when the unloading line is removed from the apparatus. With the unloading line removed from the container and the lid closed, an extension member attached to the lid covers the sidewall opening that is used for receiving the unloading line within the container.

Load line containers according to U.S. Pat. No. 5,647,412 made from fiberglass, medium density polyethylene, and high density polyethylene have been marketed in the United States and abroad. These load line containers have capacities, i.e., the maximum volume of spillage to be contained, of up to 35 gallons. The weight of the apparatus itself is nominal, but the combined weight of transfer lines and steel couplings associated with the unloading line and transfer lines is significant. In addition, the oil and waste spillage contained within the apparatus can weigh up to about 250 pounds. Finally, the apparatus is typically deployed in remote locations requiring a rugged product able to withstand rough treatment. In the past, steel collars, steel plates, and steel saddles have been used to strengthen the load line containers. It would be highly desirable to have a load line container which is sufficiently rugged for oil field application without the necessity of reinforcing steel collars, plates, and saddles.

What is needed is an injection molded load line container having a structure which is inherently strong and rugged, thereby eliminated the need for reinforcing steel collars, plates, and saddles.

SUMMARY OF THE INVENTION

An injection-molded load line connection spillage container for catching and retaining liquid spilled during transfers of liquids between storage tank and tankers provides an injection-molded reservoir and an injection-molded cover attached to the reservoir by hinges. Reinforcing ribs molded into the reservoir provide the strength and ruggedness required for oil field applications. Gussets molded into the reservoir hinge brackets ensure repeated stresses produced by energetic opening of the cover does not result in failure of the hinge brackets. An optional load line mounting assembly permits secure mounting of the load line container directly onto the load line. An optional cleanout assembly provides a valved suction line for removing retained spillage, and an optional sampling assembly provides a valved sample line for sampling the liquid being transferred. An optional main line valve contained within the load line container provides secure control of transfer between the storage tank and the tankers. An optional flow meter assembly, either in-line or clamped to the exterior of a transfer line, permits measurement of the volume of liquid transferred.

An object of the invention is to provide a rugged corrosion-resistant and wear-resistant container for collecting spillages at load line connections.

Another object of the invention is to provide a load line connection spillage container with a built-in cleanout assembly for removing captured liquids from the container.

Another object of the invention is to provide a load line connection spillage container which can endure the wear and tear associated with oil field operations.

DETAILED DESCRIPTION OF THE INVENTION

In the following description of the invention, like numerals and characters designate like elements throughout the figures of the drawings.

Figure 1:
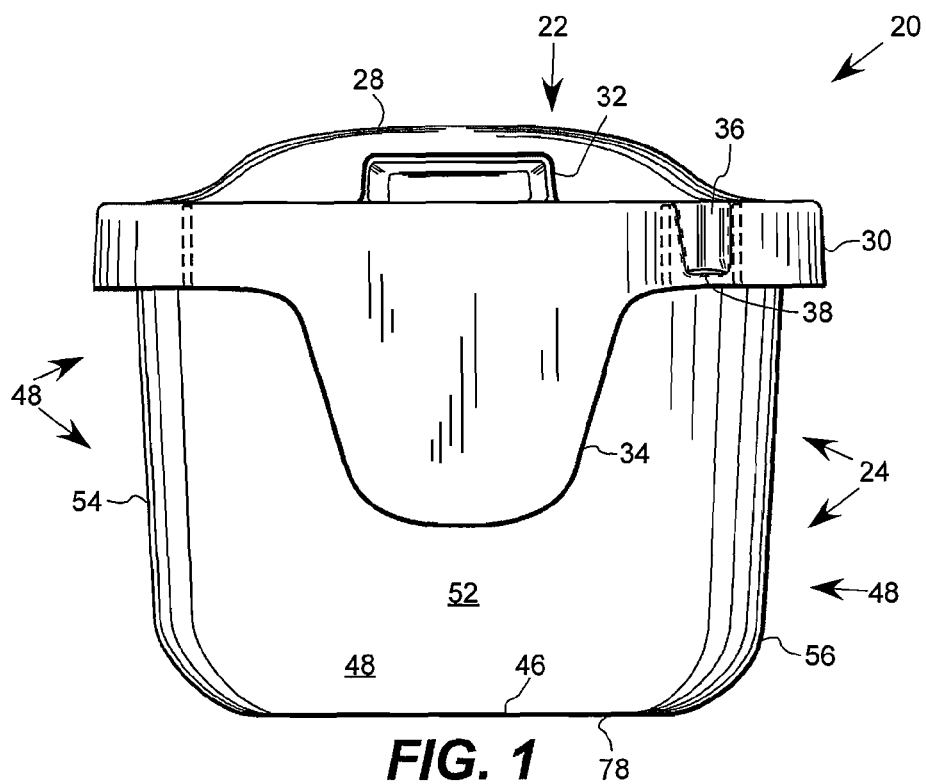
FIG. 1 is a front view of a load line connection spillage container, including a reservoir and a reservoir cover, according to the present invention.
Figure 2:
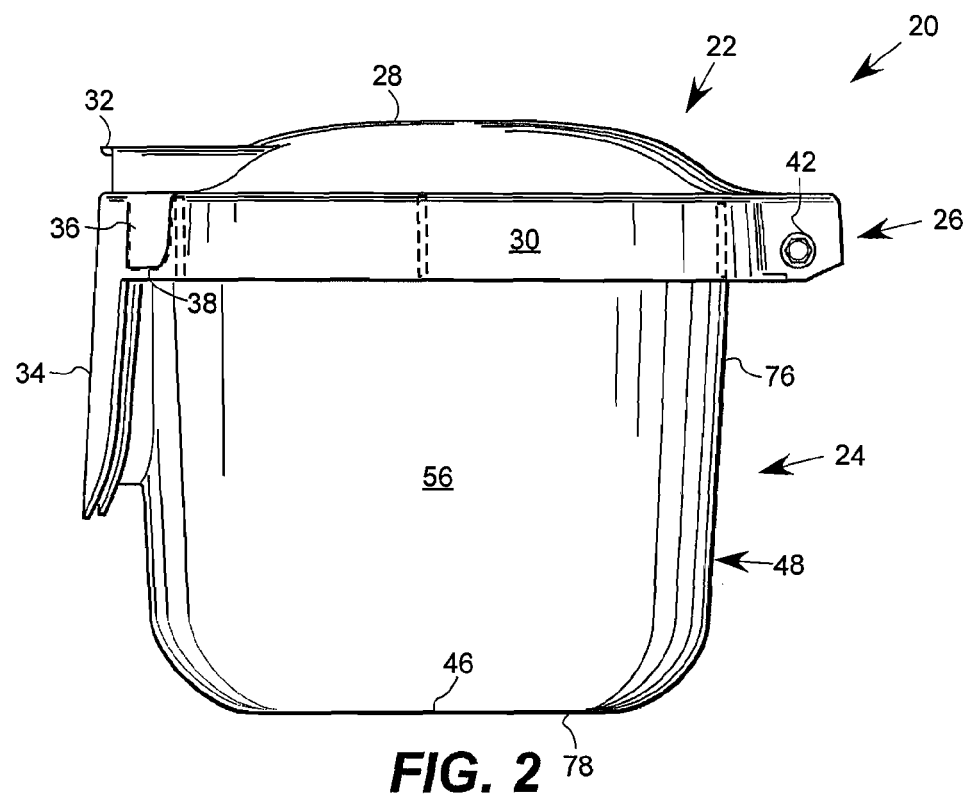
FIG. 2 is a side view of the load line connection spillage container shown in FIG. 1.
Figure 3:
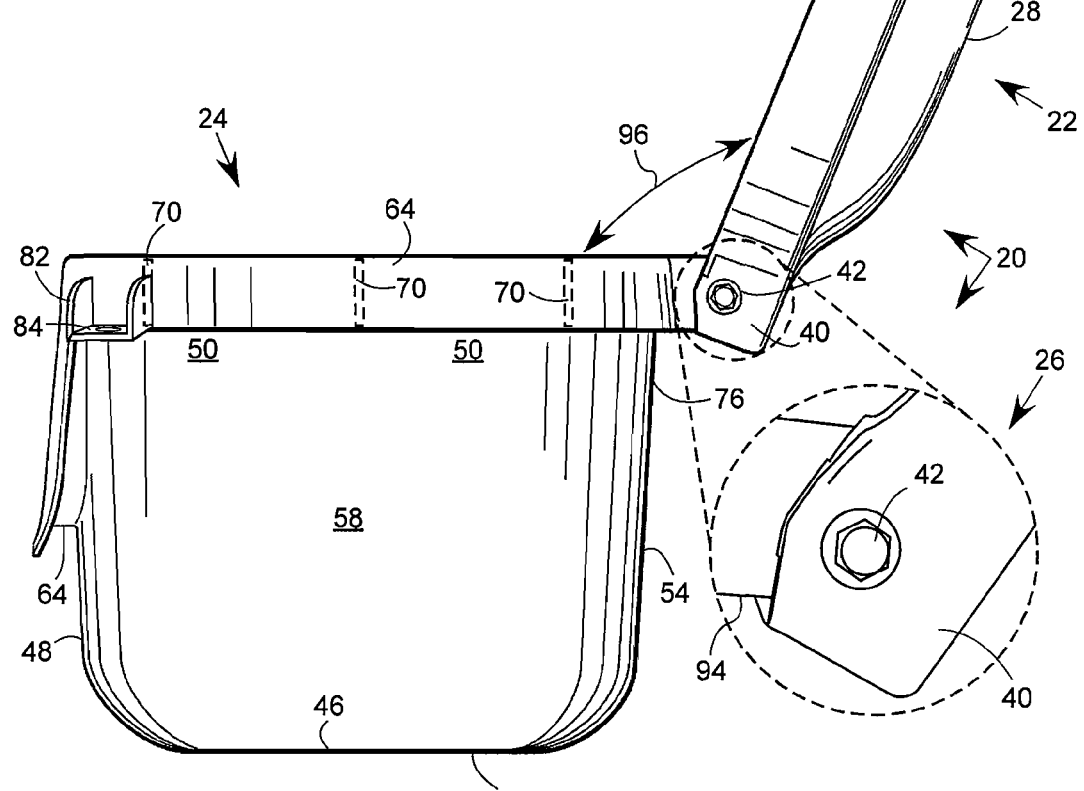
FIG. 3 is a side view, with the reservoir cover open, of the load line connection spillage container shown in FIGS. 1 and 2.

Referring generally to FIGS. 1-3, a load line container 20 has a reservoir cover 22 (also referred to herein as a cover) attached to a reservoir 24 by hinges 26. Typically, the load line container 20 is mounted on a load line (not shown) from a storage tank (not shown). Another line (not shown) extends from a removal source such as a tank truck (not shown) for connection to the loading line within the load line container 20. Thus the load line container 20 provides a point of connection between the loading line (from the storage tank) and the unloading line (from the tank truck). It will be understood by one skilled in the art that, while the present invention is described in the context of transfer of liquid from a storage tank to a removal source such as a tank truck, liquids are also routinely transferred from tank trucks to storage tanks. Thus, whereas the term "loading line" is used herein, for ease of illustration, to indicate the line attached to the storage tank and the term "unloading line" is used, for ease of illustration, to indicate the line attached to a tank truck or other removal source (e.g., a rail car), both "loading lines" and "unloading lines" are liquid transfer lines facilitating flow either to or from a storage facility.

Still referring to FIGS. 1-3, the reservoir cover 22 is generally circular with a central dome portion 28 and a lip 30. A handle 32 adjacent the lip 30 is generally centered over a downwardly projecting arcuate member 34. The downwardly projecting arcuate member 34 and the handle 32 are generally diametrically opposed to the hinges 26. A recess 36 in the lip 30 has a bore 38 therein for receiving a lock (not shown).

Figure 10:
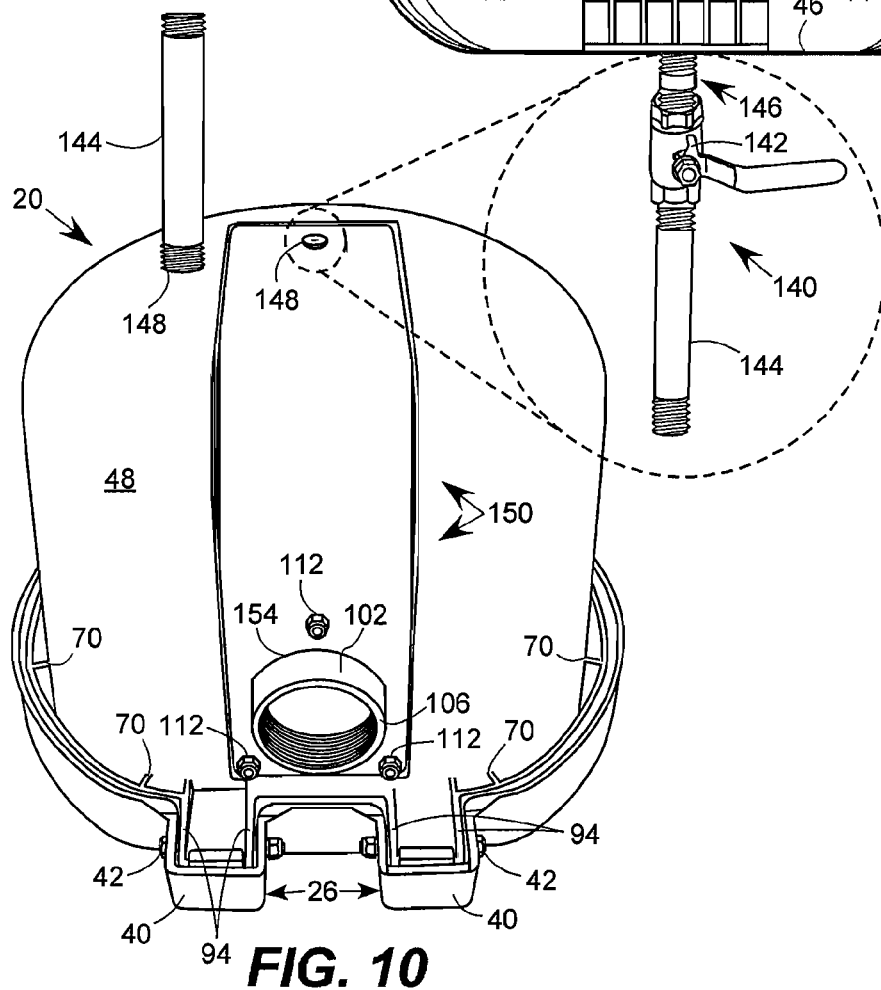
FIG. 10 is a view of the load line connection spillage container according to the present invention, together with the optional bottom drain assembly.
Figure 12:
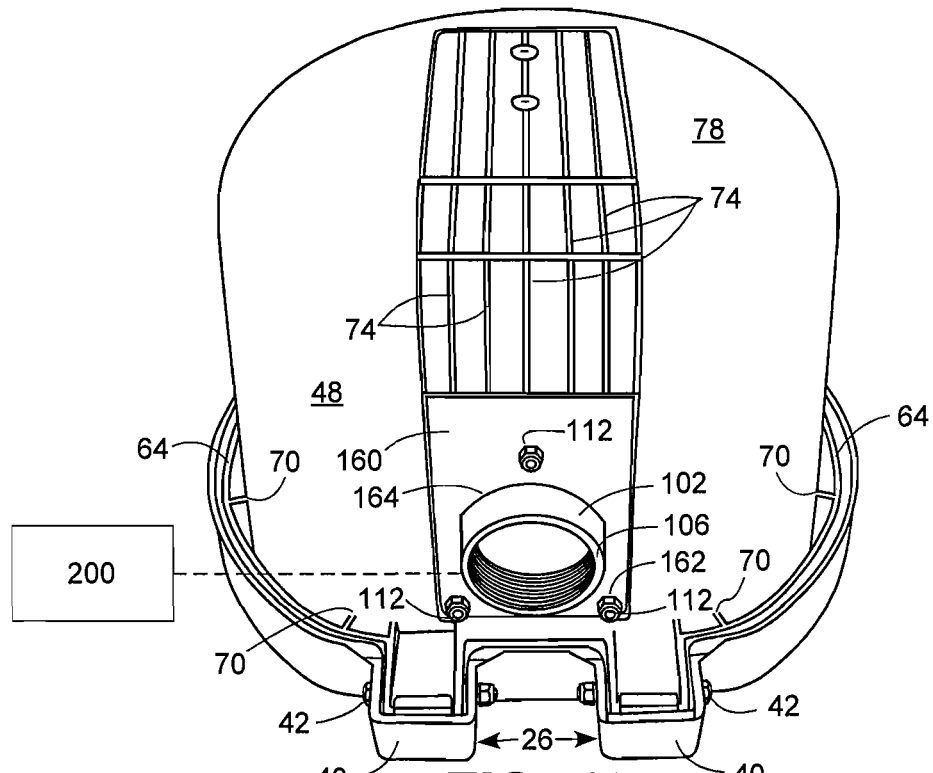
FIG. 12 is a view of another load line connection spillage container according to the present invention.

Referring now to FIG. 3, a pair of reservoir cover hinge members 40 extend outwardly from the lip 30 opposite the handle 32 and the downwardly projecting arcuate member 34. The reservoir cover hinge members 40 and the pair of hinges 26 are shown more clearly in FIG. 10 and FIG. 12. Hinge pins 42 are disposed through bores 44 (not shown) in the cover hinge members 40. In FIGS. 10 and 12, the hinge pins 42 are threaded bolts with self-locking nuts. As will be discussed more fully below, the self-locking nuts prevent access to the load line container 20 by unauthorized personnel.

Figure 4:
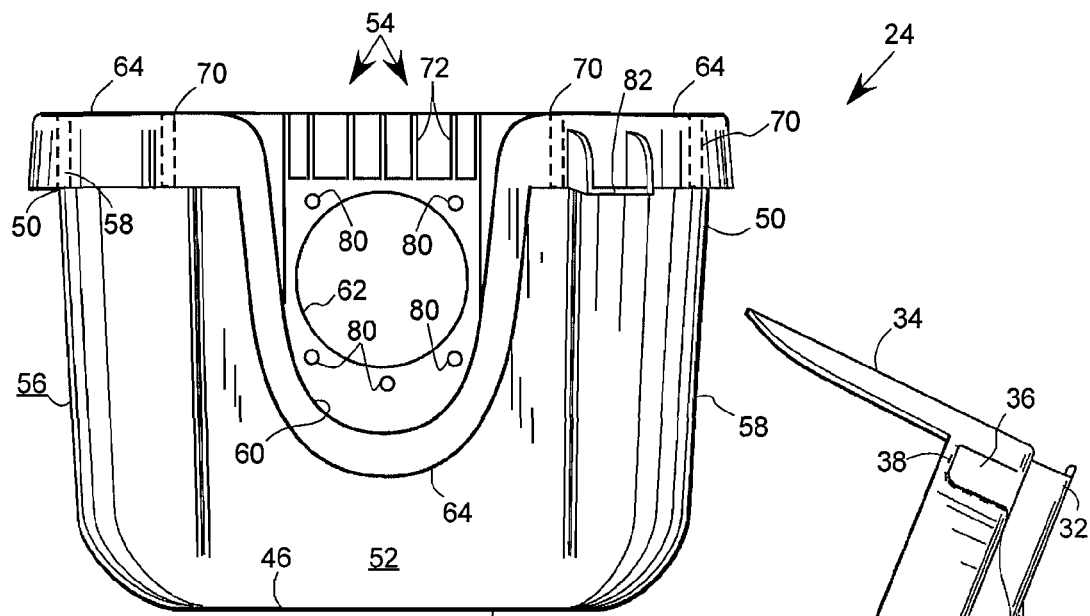
FIG. 4 is a front view, with cover and load line mounting assembly removed, of the reservoir of the load line connection spillage container shown in FIGS. 1-3.
Figure 5:
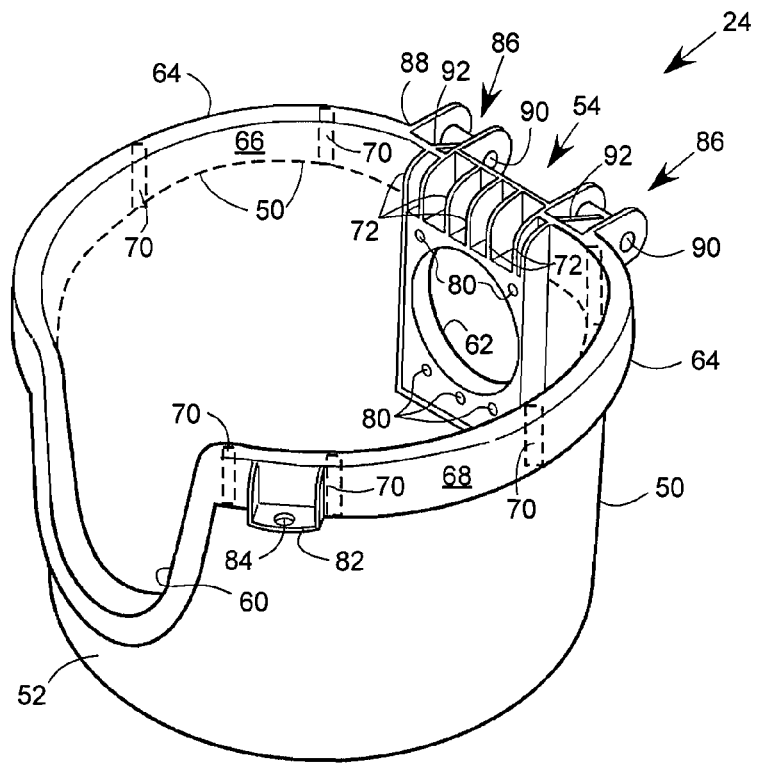
FIG. 5 is another view, with cover and load line mounting assembly removed, of the reservoir of the load line connection spillage container shown in FIGS. 1-3.
Figure 6:
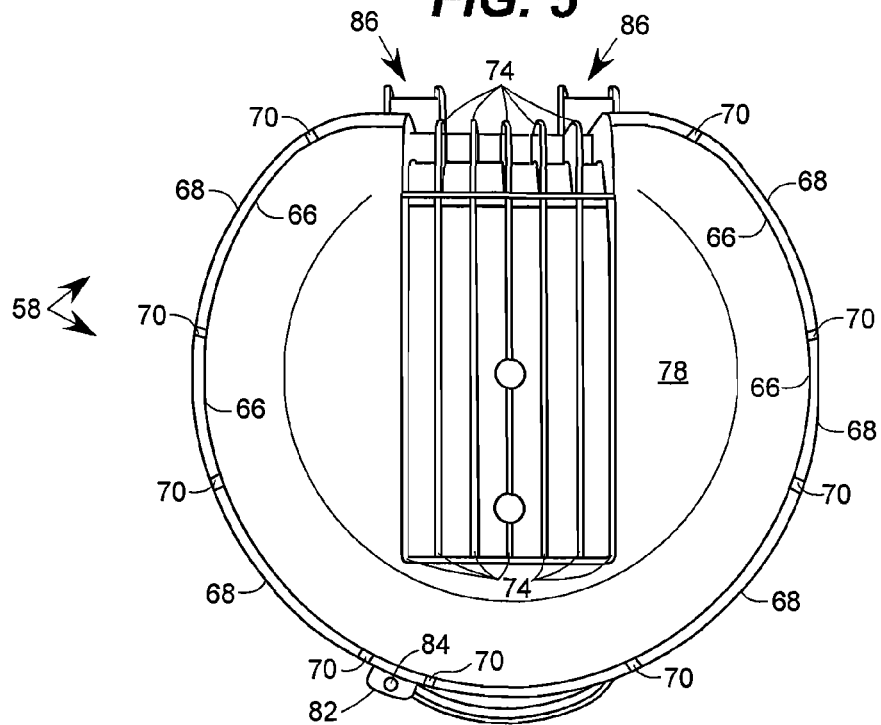
FIG. 6 is a bottom view of the reservoir of the load line connection spillage container shown in FIGS. 1-6.

Referring now to FIGS. 4-6 in conjunction with FIGS. 1-3, the reservoir 24 of the load line connection container 20 has an integrally molded bottom 46 and upstanding side walls 48 defining an open upper end portion 50. The open upper end portion 50 has a front upstanding wall portion 52, a rear upstanding wall portion 54, a left upstanding wall portion 56, and a right upstanding wall portion 58. A transfer line channel 60 located in the front upstanding wall portion 52 is sized to receive a transfer line (not shown). A load line throughway 62 located in the rear upstanding wall portion 54 provides a location for attachment of a load line mounting assembly 100 (See FIGS. 7-8). The upper end portion 50 of the reservoir 24 terminates in an integrally molded J-shaped lip 64 having a sidewall portion 66 and a rollover portion 68. Lip gussets 70 spaced about the circumference of the open upper end portion 50 between the sidewall portion 66 and the rollover portion 68 strengthen the integrally molded J-shaped lip 64 and the open upper end portion 50 of the reservoir 24.

Referring now to FIGS. 4-6, the front channel 60 is positioned opposite the load line throughway 62 located in the rear upstanding wall portion 54. Integrally molded internal reinforcing ribs 72 in the rear portion 54 of the upstanding wall 48 strengthen the rear upstanding wall portion 54 at the point of attachment of the load line connection spillage container 20 to the load line. Integrally molded external reinforcing ribs 74 extend downwardly along the exterior 76 of the rear upstanding wall portion 54 of the reservoir 24 and continue across the exterior 78 of the bottom 46 of the reservoir 24 (See FIG. 6). Bores 80 spaced around the load line throughway 62 are used to attach the load line mounting assembly 100 shown in FIGS. 7-8.

Still referring to FIGS. 4-6, an integrally molded lock bracket 82 projecting outwardly from the J-shaped lip 64 has a bore 84 for receiving a lock (not shown). The lock bracket 82 mates with the recess 36 in the container cover 22 so the bore 38 aligns with the bore 84 in the lock bracket 82 to receive the lock (not shown).

Still referring to FIGS. 4-6 in conjunction with FIG. 2, the integrally molded J-shaped lip 64 extends from one side of the rear upstanding wall portion 54 along the top of the right upstanding wall portion 58, then around the transfer line channel 60 in the front upstanding wall portion 52, and along the top of the left upstanding wall portion 56 to the other side of the rear upstanding wall portion 54. When the reservoir cover 22 is closed on the reservoir 24, as shown in FIG. 2, the cover lip 30 extends downwardly around the upper end portion 50 of the reservoir 24 and the downwardly extending member 34 of the reservoir cover 22 rests against the J-shaped lip 64 along the transfer line channel 60 in the reservoir 24, thereby closing off the transfer line channel 60. Thus the cover 22, in the closed position, prevents accumulation of water, snow, and debris within the reservoir 24. The cover 22 also prevents small animals from gaining access to the reservoir 24. Yet the reservoir 24 is vented to avoid buildup of chemical vapors.

Referring now to FIG. 4, the reservoir 24 is sized based on the volume of spillage to be contained. Likewise, the load line throughway 60 is sized to accommodate the pipe size of the loading line. For large volumes of spillage, the load line connection spillage container 20 can optionally be supported by the ground (with or without a concrete slab) or by a stand used to align the load line throughway 60 with the load line. When so deployed, the bores 80 are unnecessary.

Referring now to FIGS. 5-6, integrally molded reservoir hinge brackets 86 project rearwardly from the top portion 88 of the rear upstanding wall portion 54 of the reservoir 24. Each hinge bracket 86 has a pin bore 90 for receiving a hinge pin 42 (See FIG. 3). Integrally molded gussets 92 reinforce and strengthen the hinge brackets 86. As shown in FIG. 3 (enlarged detail), the reservoir cover hinge members 40 enclose the hinge brackets 86. When the reservoir cover 22 is in the open position, as shown in FIG. 3, the extent to which the reservoir cover 22 will open is limited, by contact of the reservoir cover hinge members 40 with the bottom sides 94 of the hinge brackets 86, to an angle 96 greater than 90 degrees. The integrally molded gussets 92 provide additional strength to what might otherwise be a failure point as the cover is moved from the closed position, as shown in FIGS. 1-2, to the open position illustrated in FIG. 3.

Figures 7, 8:
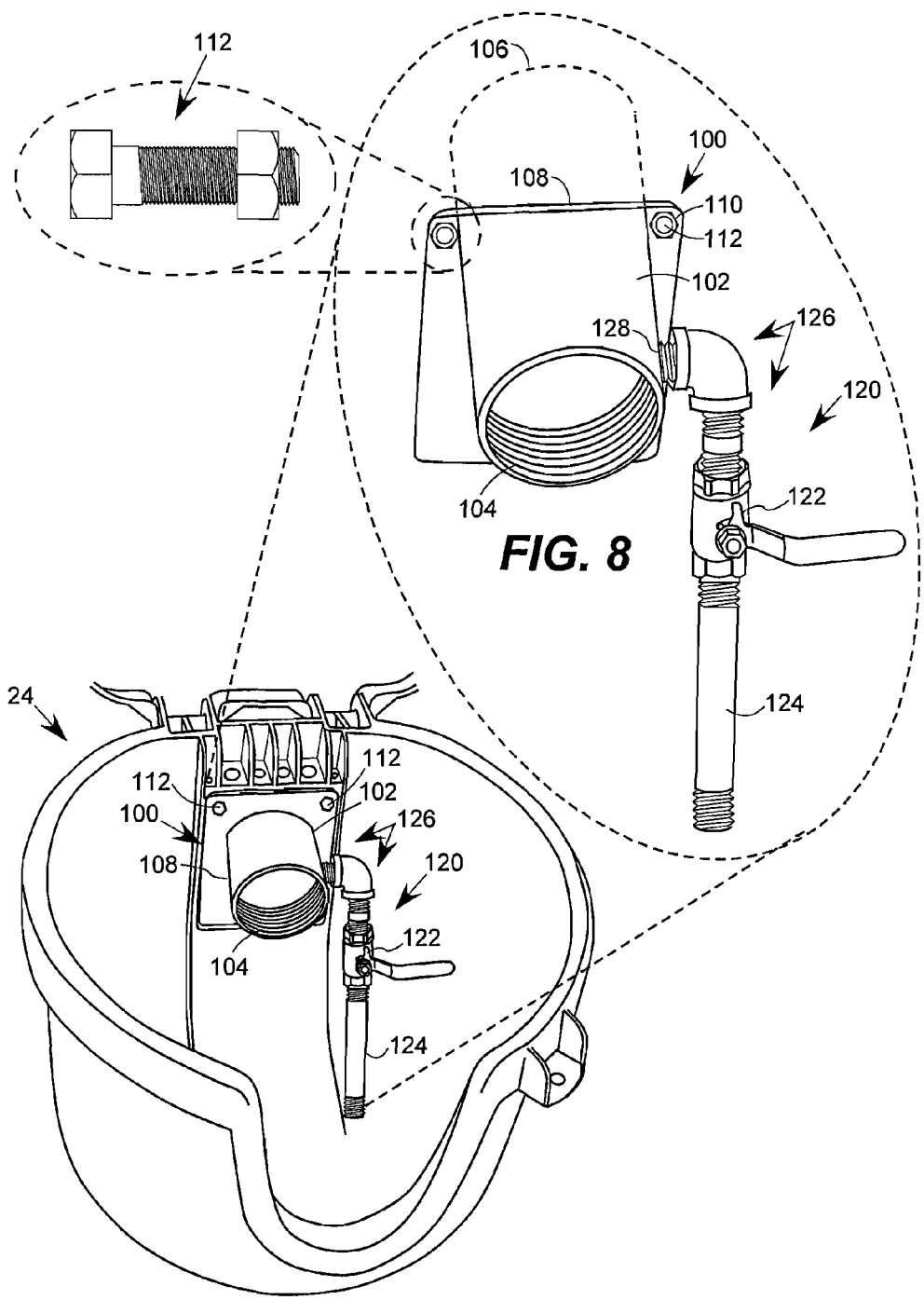
FIG. 7 is a view of the load line connection spillage container shown in FIGS. 1-3 with a load line mounting assembly and an optional clean-out assembly. The load line connection spillage container in FIG. 7 is shown with the reservoir cover partially cut away.
FIG. 8 is an enlarged detail of the load line mounting assembly and the clean-out assembly shown in FIG. 7.

Referring now to FIGS. 7-8, a load line mounting assembly 100 is shown. The load line mounting assembly 100 consists of a length of pipe 102 threaded on each end 104, 106 and a flange 108 located between the ends 104, 106. Flange bores 110 in the flange bores 108 mate with the throughway bores 80 spaced around the load line throughway 62 located in the rear upstanding wall portion 54 of the reservoir 24. Fasteners 112 secure the flange 108 to the rear upstanding wall portion 54. For security, bolts with locking nuts are preferred for the fasteners 112.

Still referring to FIGS. 7-8, an optional cleanout assembly 120 attached to the load line mounting assemOct. 24, 2008bly 100 permits evacuation of contents of the reservoir 24 through a transfer line (not shown). A valve 122 connects a suction line 124 to the load line mounting assembly 100 by appropriate pipe fittings 126 through a threaded bore 128 adjacent the threaded end 104 of the length of pipe 102. The suction line 124 is sized to extend from the valve to just above the bottom 46 of the reservoir 24. In operation, while the transfer line is in place and a pump is pulling tank contents into the tank truck, the valve 122 is opened and any liquid which has accumulated in the reservoir 24 will be transferred to the tank truck.

Figure 9:
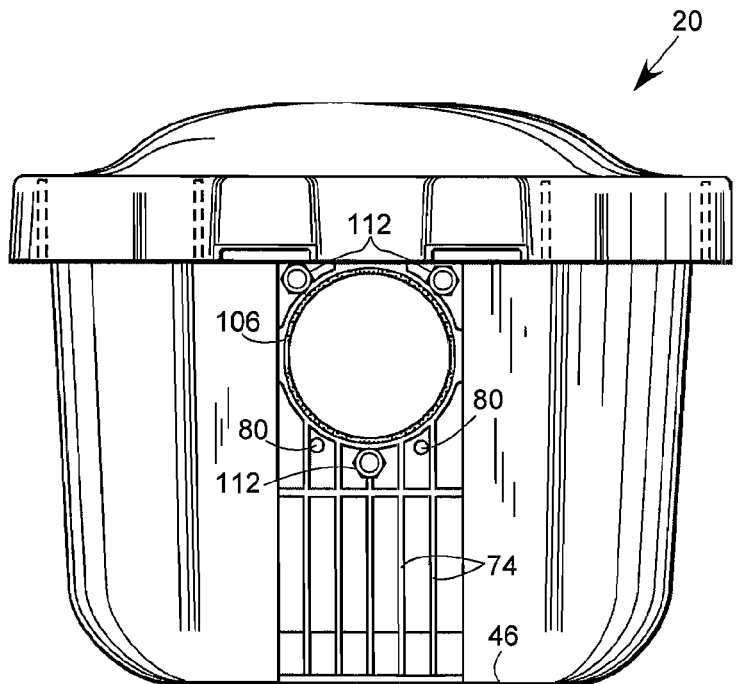
FIG. 9 is a rear view of the load line connection spillage container shown in FIGS. 1-3 and FIG. 7 with an optional bottom drain assembly.

Referring now to FIG. 9, the load line connection spillage container 20 is shown in conjunction with an optional bottom drain assembly 140. A valve 142 is connected at one end by appropriate pipe fittings 146 to the bottom 46 of the reservoir 24. A drain line 144 extends downwardly from the other end of the valve 142. When the valve 142 is opened, any liquid collected within the reservoir 24 of the load line container 20 drains from the reservoir 24 into an appropriate container (not shown).

Referring now to FIGS. 7-9, the advantages of the current invention injection molded load line connection spillage container 20 are apparent. The integrally molded internal reinforcing ribs 72 and the integrally molded external reinforcing ribs 74 permit attachment of the load line connection spillage container 20 to a loading line, using the load line mounting assembly 100, without use of additional steel collars and saddles.

Still referring to FIGS. 9-10, the optional bottom drain assembly 140 permits removal of any liquid which may accumulate in the reservoir 24. A valve 142 connects a drain line 144 to the reservoir 24 by appropriate piping 146 through a threaded bore 148 in the bottom 46 of the reservoir 24. As shown in FIG. 10, the precise location of the threaded bore 148 in the bottom 46 of the reservoir 24 is arbitrary. Any convenient location is within the scope of the present invention.

Figure 11:
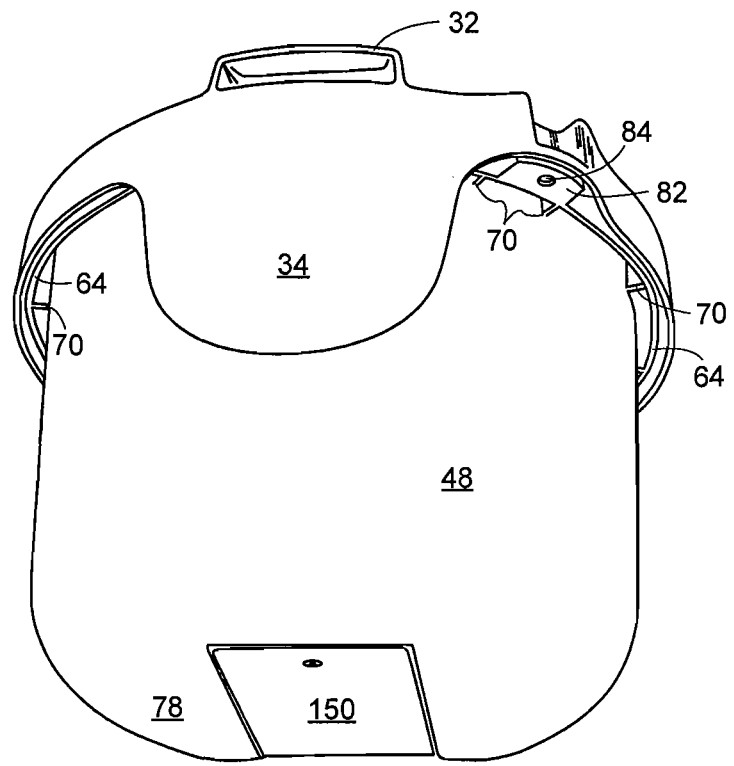
FIG. 11 is another view of the load line connection spillage container shown in FIG. 10 without the optional bottom drain.

Referring again to FIG. 10 in conjunction with FIG. 11, the load line connection spillage container 20 is shown with an optional saddle 150 which extends from the rear upstanding wall portion 54 downward and across the bottom 46 of the reservoir 24. Saddle bores 152 align with the bores 80 spaced around the load line throughway 60, and the saddle 150 is secured by the fasteners 112 used to secure the load line mounting assembly 100 to the rear upstanding wall portion 54 of the reservoir 24. One threaded end 106 of the pipe length 102 of the load line mounting assembly 100 extends through a cutout 154 in the saddle 150.

Referring now to FIG. 12, the load line connection spillage container 20 is shown with an optional backing plate 160. The backing plate 160 has backing plate bores 162 which align with the bores 80 spaced around the load line throughway 60, and the backing plate 160 is secured by the fasteners 112 used to secure the load line mounting assembly 100 to the rear upstanding wall portion 54 of the reservoir 24. One threaded end 106 of the pipe length 102 of the load line mounting assembly 100 extends through a cutout 164 in the backing plate 160.

It will be understood by one skilled in the art that the saddle 150 and the backing plate 160 are primarily cosmetic and not needed to support the weight of the load line connection spillage container 20 and its contents.

Figure 13:
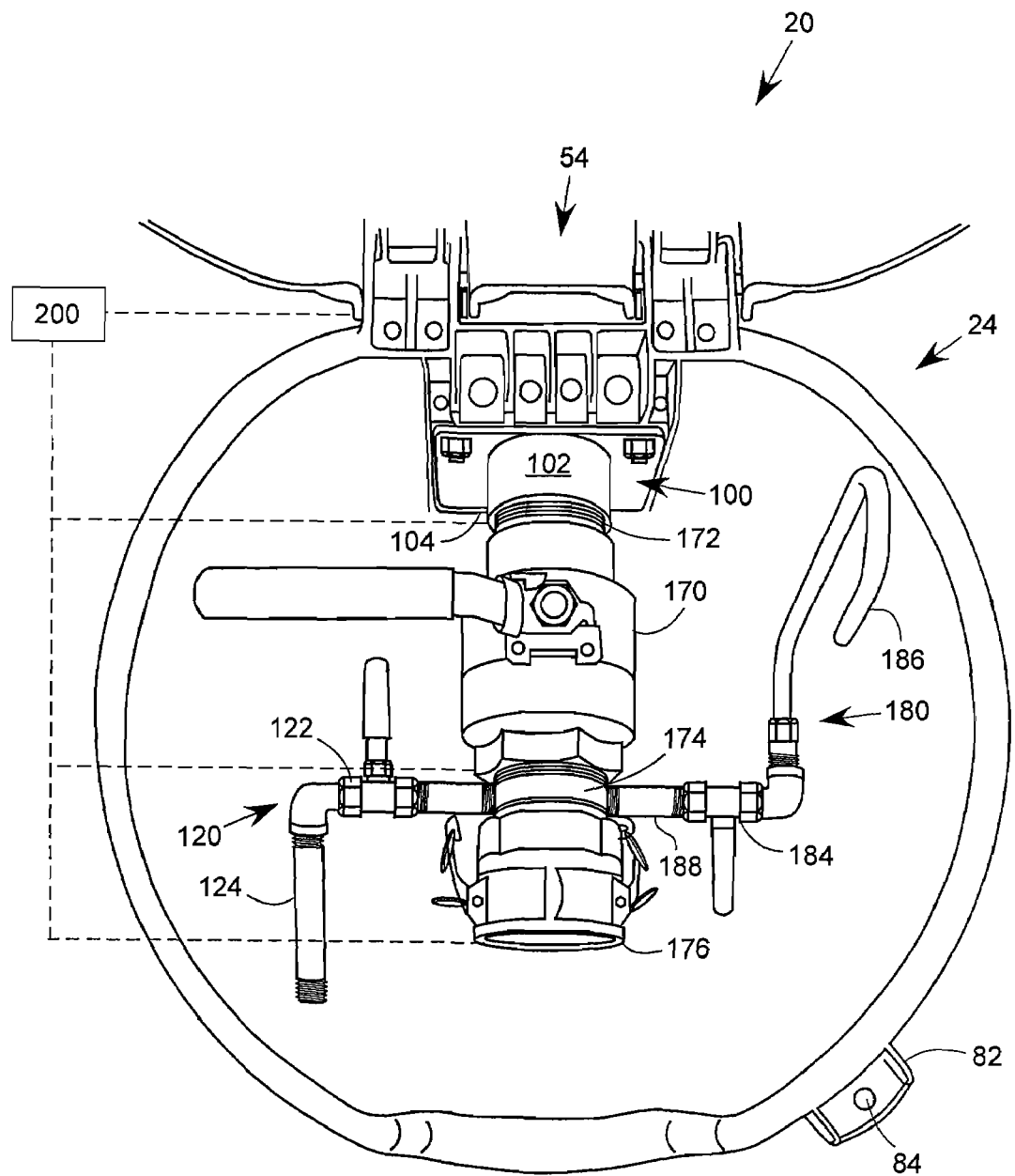
FIG. 13 is a view, with the hinged reservoir cover partially cut away, of the load line connection spillage container according to the present invention in conjunction with optional enclosed main valve, optional cleanout assembly, and optional sampling assembly.

Referring now to FIG. 13, the load line connection spillage container 20 according to the present invention is shown in conjunction with an optional enclosed main valve, an optional cleanout assembly, and an optional sampling assembly. The load line mounting assembly 100 shown in FIGS. 7-9 is secured to the rear upstanding wall portion 54 of the reservoir 24. A main valve 170 is connected at one end to the threaded end 104 of the load line mounting assembly 100 by a pipe fitting 172. A short pipe 174 connects the other end of the main valve 170 to a quick connect fitting 176. On one side of the short pipe 174, an optional cleanout assembly 120 (See FIGS. 8-9) is connected to the short pipe 174 by a threaded bore 178 (not shown) in the wall of the short pipe 174. On the other side of the short pipe 174, an optional sampling assembly 180 is connected to short pipe 174 through a second threaded bore 182 (not shown) in the wall of the short pipe 174.

Still referring to FIG. 13, the sampling assembly 180 includes a valve 184, a goose-neck sample tap 186 attached to one end of the valve 184, and a pipe fitting 188 connecting the other end of the valve 184 to the threaded boar 182 in the wall of the short pipe 174.

It will be understood by one skilled in the art that load line connection spillage container 20, when configured as shown in FIG. 13 with the optional main valve 170, the optional cleanout assembly 120, and the optional sampling assembly 180, offers substantial advantages to oil field operators. With the load line connection spillage container locked, access is restricted to the load line, thereby precluding unauthorized persons from draining the storage tank. The cleanout assembly 120 permits easy removal of liquids from the reservoir 24, and the sampling assembly 180 permits sampling of crude oil or other liquids being transferred from the storage tank to the tank truck.

The load line connection spillage container 20 can be manufactured from any thermoplastic or thermosetting plastic material suitable for injection molding. The most commonly used thermoplastic materials are polystyrene (low cost but lacking the strength and longevity of other materials), ABS or acrylonitrile butadiene styrene (a ter-polymer or mixture of compounds used for everything from toy parts to electronics housings), polyamide (chemically resistant, heat resistant, tough and flexible), polypropylene (tough and flexible), polyethylene (also tough and flexible), and polyvinyl chloride or PVC (more commonly extruded to make pipes, window frames, or wiring insulation where high proportions of plasticizer are added for flexibility). Plastics reinforced with short fibers can also be injection molded.

Referring now to FIGS. 12 and 13, an optional flow meter assembly 200 positioned at a convenient location measures the flow between the storage tank (not shown) and the tank truck (not shown). Many different types and styles of flow meters are well known in the art. In-line flow meters are placed in a transfer line using suitable fittings. New technological breakthroughs have enabled measurement of fluids, including oil and water mixtures, using clamp-on designs. It will be understood by one skilled in the art that the flow meter assembly 200 may be placed either within or without the reservoir 24.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A injection molded load line connection spillage container for catching and retaining liquid spilled when liquids are pumped between storage tanks and tankers, wherein the transfer line from the storage tank is characterized as a load line and the transfer line from the tanker is characterized as an unloading line, the load line connection spillage container comprising:

an injection molded reservoir having a bottom and upstanding walls defining an opening therein, the upstanding walls being further characterized as a rear upstanding wall portion, a front upstanding wall portion, a left upstanding wall portion, and a right upstanding wall portion, the rear upstanding wall portion having a load line throughway therein and the front upstanding wall portion having a channel therein generally aligned with the load line throughway in the rear upstanding wall portion, and wherein reinforcing ribs are molded into the rear upstanding wall portion;

wherein the upstanding wall portions terminate in an outwardly turned J-shaped lip containing integrally molded gussets to strengthen and reinforce the reservoir opening, the J-shaped lip having an integrally molded lock recess and a bore therethrough;

an injection molded reservoir cover having a circumferential lip and an integrally molded lock bracket on the circumferential lip, so that the integrally molded lock bracket on the lip mates with the integrally molded lock recess on the reservoir and the bores in the molded lock bracket of the reservoir cover and in the integrally molded lock recess are aligned when the reservoir cover is placed on the reservoir;

hinge means for hingedly attaching the reservoir cover to the reservoir; and wherein, with the reservoir cover open, the load line from the storage tank is received through the load line throughway in the rear upstanding wall portion, the unloading line from the tanker is received in the channel in the front upstanding wall portion, and the connection between the load line from the storage tank and the unloading line from the tanker is made within the reservoir so any spillage is caught and retained within the reservoir.

2. The device of claim 1, wherein the reservoir cover is generally circular with a central dome portion and a circumferential downwardly extending lip, the cover has an integrally molded handle adjacent the lip generally centered over a downwardly projecting arcuate member; and wherein the hinge means further comprises:

rearwardly projecting cover hinge members diametrically opposite the downwardly projecting arcuate member, each rearwardly projecting cover hinge member having a generally horizontal reservoir cover hinge member pin bore therethrough for receiving a hinge pin;

integrally molded rearwardly projecting reservoir hinge brackets projecting rearwardly from the top portion of the rear upstanding wall portion of the reservoir, each rearwardly projecting hinge bracket having a generally horizontal reservoir hinge bracket pin bore therethrough for receiving a hinge pin, each integrally molded rearwardly projecting reservoir hinge bracket having an integrally molded reinforcing gusset extending between the reservoir hinge bracket pin bore and the rear upstanding wall portion to reinforce and strengthen the integrally molded reservoir hinge brackets, so that, when the reservoir cover is in the closed position on the reservoir, the rearwardly projecting reservoir cover hinge members and the rearwardly projecting reservoir hinge brackets cooperate to receive hinge pins;

hinge pins disposed within the aligned reservoir cover hinge bracket pin bores and reservoir hinge bracket pin bores; and wherein, when the reservoir cover is in the open position, the extent to which the reservoir cover will open is limited, by contact of the reservoir cover hinge members with the bottom sides of the integrally molded reservoir hinge brackets, to an opening angle of about 110 to 130 degrees.

3. The device of claim 2, wherein the reinforcing ribs molded into the rear upstanding wall portion extend downwardly and across the bottom of the injection molded reservoir.

4. The device of claim 3, further comprising load line mounting means for mounting the load line container directly on the load line, the load line mounting means further comprising:

a plurality of throughway bores spaced around the load line throughway in the rear upstanding wall portion; and a length of pipe having a flange located between threaded pipe ends, the flange having a plurality of spaced flange bores, so one threaded pipe end extends through the throughway for attachment to the load line, the flange bores mate with the throughway bores to receive fasteners which secure the flange to the reinforced rear upstanding wall portion of the reservoir, and the other threaded pipe end is attached to the unloading line.

5. The device of claim 4, wherein the fasteners are bolts with self-locking nuts.

6. The device of claim 4, further comprising a cleanout assembly attached to the length of pipe of the load line mounting means, the cleanout assembly further comprising:

a valve connected at one end by pipe fittings to the length of pipe of the load line mounting assembly at the other end to a suction line extending from the valve to just above the bottom of the reservoir so that, while the unloading line is in place and a pump is pumping tank contents from the storage tank into the tanker, opening of the valve causes any liquid which has accumulated in the reservoir to be transferred to the tanker.

7. The device of claim 3, further comprising a bottom drain assembly attached to the bottom of the load line container, the bottom drain assembly comprising:

a valve connected at one end by pipe fittings to the bottom of the reservoir; and a drain line extending downwardly from the other end of the valve so that, when the valve is opened, any liquid collected within the reservoir of the load line container.

8. The device of claim 3, wherein the injection reservoir and the reservoir cover are molded from a thermoplastic material.

9. The device of claim 3, wherein the reservoir and the reservoir cover are molded from a thermosetting plastic material.

10. The device of claim 8, wherein the thermoplastic material is polyethylene.

11. The device of claim 10, wherein the polyethylene is medium density polyethylene.

12. The device of claim 10, wherein the polyethylene is high density polyethylene.

13. The device of claim 3, wherein the reservoir and the reservoir cover are molded from a thermoplastic material reinforced with fibers.

14. The device of claim 3, wherein the reservoir and the reservoir cover are molded from a polyamide.

15. The device of claim 3, wherein the reservoir and the reservoir cover are molded from ABS plastic.

16. The device of claim 4, further comprising a backing plate having a cutout and spaced backing plate bores around the cutout, so that the backing plate is placed over the rearward projecting threaded end of the pipe length of the load line mounting assembly and secured to the rear upstanding wall portion of the reservoir opposite the load line mounting assembly and to the load line mounting assembly flange by fasteners disposed in aligned bores spaced around the load line throughway, backing plate bores, and flange bores.

17. The device of claim 4, further comprising a sampling assembly for sampling liquid transferred between the storage tank and the tanker, the sampling assembly further comprising:
 a short pipe fitting attached to the load line mounting assembly within the reservoir, the short pipe having a generally horizontal pipe-threaded bore, therein; and
 a valve connected at one end to the generally horizontal pipe-threaded bore in the short pipe and at the other end to a goose-neck sample tap.

18. The device of claim 4, further comprising an enclosed main valve attached to a threaded end of the short pipe of the load line mounting assembly within the reservoir.

19. The device of claim 4, further comprising:
 a saddle having a cutout for receiving the rearwardly projecting threaded end of the short pipe length of the load line mounting assembly, the saddle extending from the rear upstanding wall portion downwardly and across the bottom of the reservoir, the saddle having spaced saddle bores which align with the bores spaced around the load line throughway of the rear upstanding wall portion and the flange bores in the flange of the load line mounting assembly so that fasteners disposed in the aligned bores secure the rear upstanding wall portion of the reservoir between the flange of the load line mounting assembly and the saddle.

20. The device of claim 4, further comprising a flow meter assembly attached to a transfer line.

\* \* \* \* \*